(12) United States Patent
Wu et al.

(10) Patent No.: US 8,345,628 B2
(45) Date of Patent: Jan. 1, 2013

(54) METHOD AND APPARATUS FOR MOBILE INTERNET PROTOCOL REGISTERING OR DEREGISTERING

(75) Inventors: Jianjun Wu, Shenzhen (CN); Bin Xia, Shenzhen (CN); Zhengfei Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1161 days.

(21) Appl. No.: 12/032,922

(22) Filed: Feb. 18, 2008

(65) Prior Publication Data

US 2008/0139147 A1  Jun. 12, 2008

Related U.S. Application Data

(63) Continuation of application No. PCT/CN2006/002008, filed on Aug. 9, 2006.

(30) Foreign Application Priority Data

Aug. 19, 2005  (CN) .......................... 2005 1 0093218
Oct. 17, 2005  (CN) .......................... 2005 1 0109259

(51) Int. Cl.
H04L 12/24 (2006.01)

(52) U.S. Cl. .......................... 370/331; 370/338; 455/436

(58) Field of Classification Search .................. 370/331, 370/328, 400; 455/436, 439, 187, 434, 435.2
See application file for complete search history.

(56) References Cited

U.S. PATENT DOCUMENTS

| | | | |
|---|---|---|---|
| 6,621,810 B1 | 9/2003 | Leung | |
| 6,665,718 B1 | 12/2003 | Chuah et al. | |
| 7,840,217 B2 * | 11/2010 | Patel et al. | 455/439 |
| 8,050,233 B2 | 11/2011 | Gu et al. | |
| 2003/0193952 A1 | 10/2003 | O'Neill | |
| 2004/0098507 A1 | 5/2004 | Thubert et al. | |
| 2005/0120136 A1 | 6/2005 | Park et al. | |
| 2006/0206597 A1 * | 9/2006 | Kim et al. | 709/220 |
| 2007/0254661 A1 * | 11/2007 | Chowdhury et al. | 455/436 |
| 2008/0139147 A1 | 6/2008 | Wu et al. | |

FOREIGN PATENT DOCUMENTS

| | | |
|---|---|---|
| CN | 1794678 A | 6/2006 |
| EP | 1 524 805 A2 | 4/2005 |
| JP | 11-284666 A | 10/1999 |
| JP | 2003-298634 A | 10/2003 |
| KR | 20020095449 A | 12/2002 |
| WO | 2004/047406 A1 | 6/2004 |
| WO | WO 2005/046132 A1 | 5/2005 |

OTHER PUBLICATIONS

International Search Report for International Application No. PCT/CN2006/002008, dated Dec. 14, 2006, with English translation.
Korean Office Action for Korean Patent Application No. 10-2008-7006655, dated Sep. 18, 2009, and English translation thereof.
"Combined PMIP—CMIP—coexistence stage 2 text," WiMAX Forum Networking Group, 050714_NWG_Inter-NAP-Mobility-accepted_r5.doc, Jul. 14, 2005, 37 pages, Alcatel, Cisco, Lucent.
Written Opinion of the International Searching Authority, International Application No. PCT/CN2006/002008, Applicant: Huawei Technologies Co., Ltd., Dated: Dec. 14, 2006, 4 pages.
Japanese Office Action, Japanese Application No. 2008-526357, Dated: Jan. 18, 2011, 4 pages.
Second Chinese Office Action, Application No. 200680013219.9, 2010, 7 pages.

* cited by examiner

*Primary Examiner* — Seema S Rao
*Assistant Examiner* — Henry Baron
(74) *Attorney, Agent, or Firm* — Slater and Matsil, LLP

(57) ABSTRACT

A method for implementing MIP registration or deregistration includes obtaining, by a physical entity in which a destination MIP Foreign Agent (FA) resides, an identity of a mobile terminal (MT ID) and address information of an anchor proxy mobile node or an authenticator; sending a message carrying the MT ID to the anchor proxy mobile node or the authenticator; and implementing MIP registration or deregistration for the mobile terminal corresponding to the MT ID using a credential, in which the credential corresponding to the MT ID is acquired from the anchor proxy mobile node or authenticator.

12 Claims, 7 Drawing Sheets

METHOD AND APPARATUS FOR MOBILE INTERNET PROTOCOL REGISTERING OR DEREGISTERING

CROSS-REFERENCE TO RELATED APPLICATIONS

This application is a continuation of International Patent Application No. PCT/CN2006/002008 filed on Aug. 9, 2006. This application claims the benefit of Chinese Patent Application No. 200510093218.7 filed Aug. 19, 2005 and Chinese Patent Application No. 200510109259.0 filed Oct. 17, 2005. The disclosures of the above applications are incorporated herein by reference.

FIELD

The present disclosure relates to mobile Internet technologies, and to technologies for Mobile Internet Protocol (MIP) registering or deregistering.

BACKGROUND

The statements in this section merely provide background information related to the present disclosure and may not constitute prior art.

MIP is a solution for transmitting information for a mobile node. MIP is independent of communication media adopted by the mobile node. The MIP allows the mobile node to change its location, on condition that neither is the communication broken, nor is an application program restarted. At the same time, MIP provides an IP route mechanism, which enables the mobile node to connect to any link via a permanent IP address. In accordance with MIP, when a mobile node switches from a home link to a foreign link and receives an agent broadcast message sent from a Foreign Agent (FA), the mobile node obtains Care-of Address (CoA) from the agent broadcast message. The mobile node initiates MIP registration to its Home Agent (HA) to notify the HA of the CoA. Likewise, when the mobile node switches from the foreign link to the home link or breaks the connection with the network abnormally, a MIP deregistration is initiated to notify the HA of deleting the CoA.

A Centralized Worldwide Interoperability for Microwave Ranging (WIMAX) system provides two different modes for implementing MIP, i.e. Client MIP (CMIP) mode and Proxy MIP (PMIP) mode. The CMIP mode is identical to the conventional MIP mode, i.e. all functions of the mobile node are implemented on a mobile terminal, and the MIP registration or deregistration is initiated by a MIP client set on the mobile terminal. In this mode, the MIP registration or deregistration is opaque for the mobile terminal. In the PMIP mode, the MIP client is detached from the mobile terminal and set in a logical network element, such as a Proxy Mobile Node, in Accessing Service Network (ASN). In this mode, the MIP registration or deregistration is initiated by the proxy mobile node in the ASN, the foreign link locates at the ASN. Therefore, the MIP registration or deregistration is transparent for the mobile terminal. For the mobile terminal, it always works on the home link. A proxy mobile node may initiate the MIP registration or deregistration instead of a plurality of mobile terminals.

In the CMIP mode or the PMIP mode, a credential is established for each mobile terminal between the MIP client and the HA to implement the MIP registration or deregistration. The credential is saved in the HA of a mobile terminal and in an anchor proxy mobile node. The anchor proxy mobile node is a proxy mobile node specially used for saving the credential of the mobile terminal. The anchor proxy mobile node and a proxy mobile node corresponding to the home Base Station (BS) of the mobile terminal are configured in the same entity or different entities. The MIP registration or deregistration of the mobile terminal is initiated by the proxy mobile node corresponding to the home BS of the mobile terminal or the anchor proxy mobile node. If the proxy mobile node corresponding to the home BS of the mobile terminal and the anchor proxy mobile node is not configured in the same entity, the proxy mobile node corresponding to the home BS of the mobile terminal obtains the credential of the mobile terminal from the anchor proxy mobile node, and then initiates the MIP registration or deregistration of the mobile terminal.

The procedure of MIP registration or deregistration is described as follows. A MIP client calculates a Message Authentication Code (MAC) of a registration or deregistration request message according to an obtained or saved credential of the mobile terminal. The MIP client resides in a proxy node or an anchor proxy mobile node corresponding to the home BS of the mobile terminal. Then, the MIP client carries the MAC and an identity of a mobile terminal (MT ID), in the registration or deregistration request message and sends the request message to the HA. The HA first searches for and acquires the credential of the mobile terminal upon the receipt of the registration or deregistration request message. Then, the HA calculates the MAC of the registration or deregistration request message according to the credential. Then, the HA matches the calculated MAC with the MAC carried in the registration or deregistration request message. If the calculated MAC is matched with the MAC carried in the registration or deregistration request message, the HA sends a registration or deregistration response message to the MIP client. The registration or deregistration response message carries the MT ID and the MAC of the registration or deregistration response message, the MAC is obtained according to the credential of the mobile terminal. Upon the receipt of the registration or deregistration response message, the MIP client first searches for the credential of the mobile terminal according to the MT ID carried in the registration or deregistration response message, and calculates the MAC of the registration or deregistration response message according to the credential. Then, the MIP client matches the calculated MAC with the MAC carried in the registration or deregistration response message. If the calculated MAC is matched with the MAC carried in the registration or deregistration response message, the MIP client accepts the registration or deregistration response message. At the same time, the MIP registration or deregistration is finished.

SUMMARY

Methods and apparatus for Mobile Internet Protocol registering or deregistering, so that MIP registration or deregistration can be initiated when an entity which is used for initiating the MIP registration or deregistration instead of a MIP client of a mobile terminal is changed.

A method for MIP registering or deregistering includes:
obtaining, by a physical entity in which a destination MIP Foreign Agent, FA, resides, an identity of a mobile terminal, MT ID, and address information of an anchor proxy mobile node or an authenticator;
sending a message carrying the MT ID to the anchor proxy mobile node or the authenticator; and implementing MIP registration or deregistration for the mobile terminal corresponding to the MT ID using a credential, in which the credential corresponding to the MT ID is acquired from the anchor proxy mobile node or authenticator.

A physical entity in which a destination Mobile Internet Protocol, MIP, Foreign Agent, FA, resides for implementing MIP registration or deregistration, includes:

a unit, configured to send a credential request message carrying an identity of a mobile terminal, MT ID to an anchor proxy mobile node or an authenticator according to address information of the anchor proxy mobile node or the authenticator; and a unit, configured to implement MIP registration or deregistration using a credential corresponding to the MT ID, wherein the credential is received from the anchor proxy mobile node or the authenticator.

An anchor proxy mobile node or an authenticator for implementing Mobile Internet Protocol, MIP, registration or deregistration, includes:

a first unit, configured to receive a message which is sent from a physical entity in which a destination MIP Foreign Agent, FA, resides and used for carrying an identity of a mobile terminal, MT ID;

a second unit, configured to search for a credential saved by the anchor proxy mobile node or the authenticator according to the MT ID; and a third unit, configured to implement MIP registration or deregistration using the credential.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
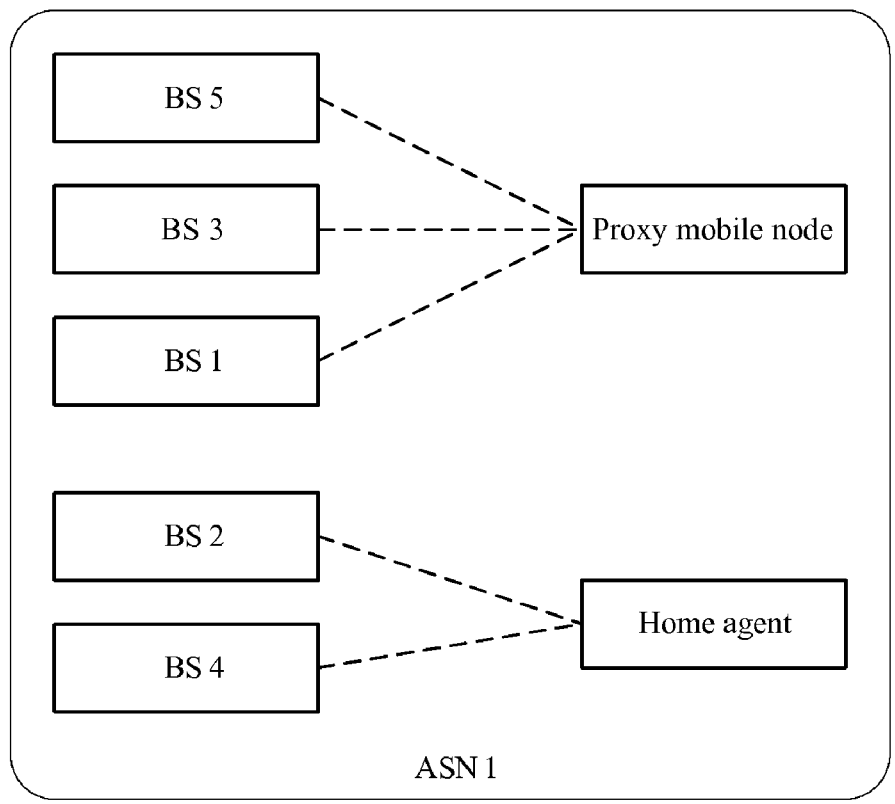
FIG. 1 is a schematic diagram of a relation between a BS and a proxy mobile node in a centralized WIMAX network architecture.
Figure 2:
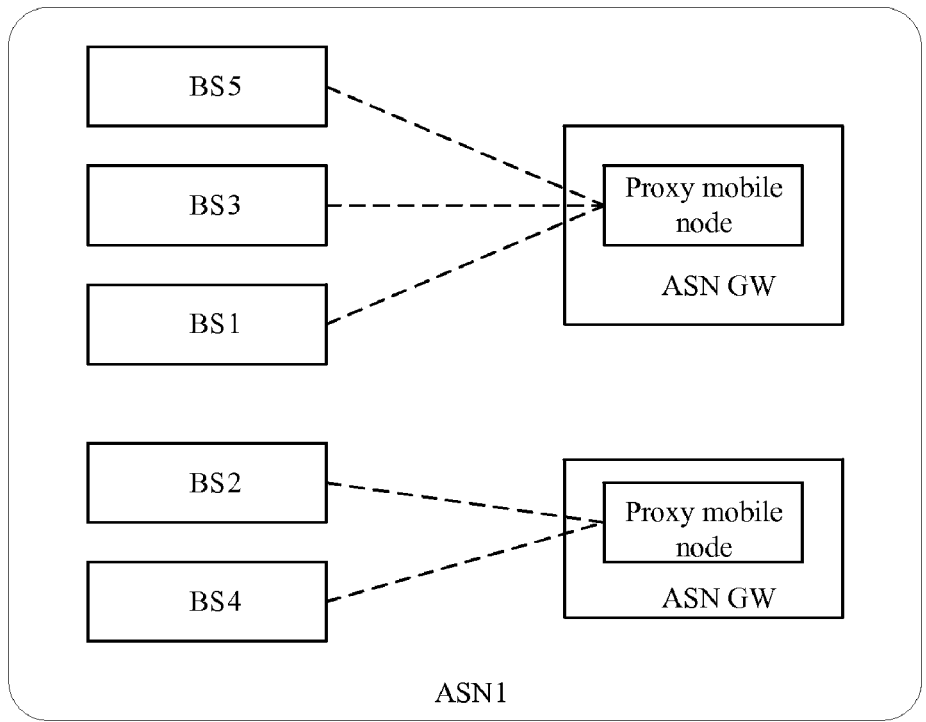
FIG. 2 is a schematic diagram of another relation between the BS and the proxy mobile node in the centralized WIMAX network architecture.
Figure 3:
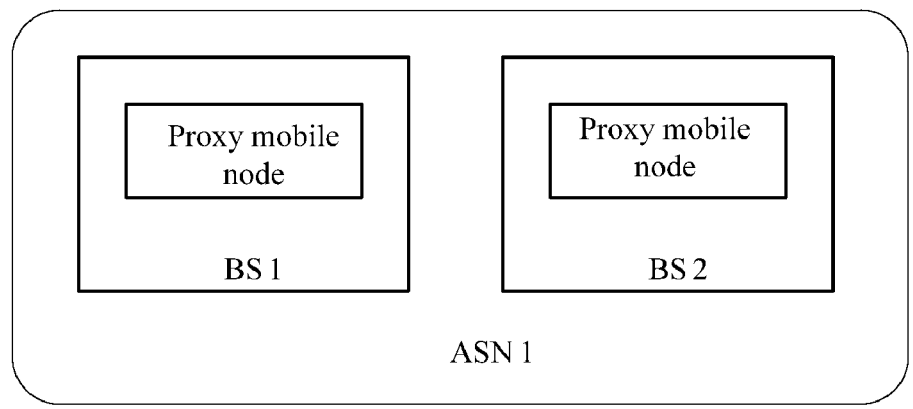
FIG. 3 is a schematic diagram of a relation between a BS and a proxy mobile node in a distributed WIMAX network architecture.

As for the standards and proposals related to WIMAX in public, a MIP client is configured in a proxy mobile node for a PMIP mode. Each proxy mobile node corresponds to multiple or one BS according to different network architectures. Referring to FIGS. 1 and 2, in the centralized WIMAX network architecture, for an ASN such as ASN1, a plurality of BSs, such as BS1, BS3, BS5, share one proxy mobile node, where the proxy mobile mode can be located in an ASN gateway (GW). Referring to FIG. 3, in the distributed WIMAX network architecture, one proxy mobile node is configured in one BS, an anchor proxy mobile node needs to save a credential of a mobile terminal used for initiating MIP registration or deregistration. In general, a logical network element in an ASN, i.e. Authenticator, and the anchor proxy node are configured in the same physical entity.

An effect caused by the handover of a mobile terminal in the network architecture shown in FIGS. 1 to 3 is described as follows. After a mobile terminal switches to a destination BS, a proxy mobile node corresponding to the destination BS of the mobile terminal after handover may be different from the proxy mobile node corresponding to a serving BS of the mobile terminal before handover. Because the proxy mobile node corresponding to the destination BS of the mobile terminal after handover does not save a credential of the mobile terminal, MIP registration or deregistration of the mobile terminal is unable to be initiated. Furthermore, the mobile terminal does not switch to another BS, but the proxy mobile node used for initiating MIP registration or deregistration is changed because of resource optimization or other reasons.

Figure 4:
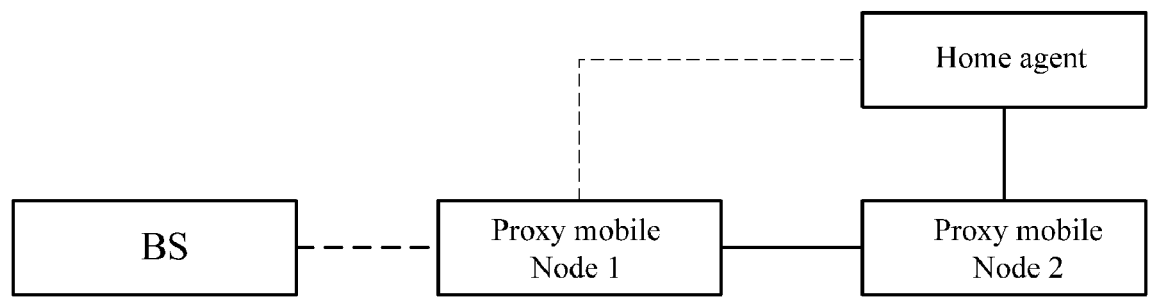
FIG. 4 is a schematic diagram of a proxy mobile node of a mobile terminal is changed, but not BS handover of the mobile terminal.

The changed proxy mobile node does not save the credential of the mobile terminal, and the MIP registration or deregistration of the mobile terminal may not be initiated. For example, referring to FIG. 4, BS corresponds to a proxy mobile node 1. The proxy mobile node 1 connects to HA via a proxy mobile node 2. Therefore, the proxy mobile node 2 initiates MIP registration or deregistration to the HA instead of the mobile terminal, i.e. the proxy mobile node 2 saves a credential of the mobile terminal. Afterwards, the proxy mobile node 1 is configured to connect to the HA directly for the sake of resources optimization. The proxy mobile node 1 needs to acquire the credential of the mobile terminal to initiate the MIP registration or deregistration of the mobile terminal. Conventional systems do not adequately address this effect.

Since the proxy mobile node is a logical function entity, in practice, the function for a proxy mobile node initiating a MIP registration or deregistration request instead of the MIP client of a mobile terminal is implemented by a physical entity, such as ASN GW, where a FA of the MIP client resides in the physical entity. Therefore, before the entity initiating a MIP registration or deregistration request, instead of the MIP client of the mobile terminal, is changed, the entity initiating a MIP registration or deregistration request, instead of the MIP client of the mobile terminal, is referred to as a physical entity in which the FA of the serving MIP resides, which is referred to as the "first physical entity" in the following description. After the entity initiating a MIP registration or deregistration request, instead of the MIP client of the mobile terminal, is changed, the entity initiating a MIP registration or deregistration request, instead of the MIP client of mobile terminal, is referred to as a physical entity in which the FA of destination MIP resides, which is referred to as the "second physical entity" in the following description.

According to various embodiments, the first physical entity first acquires address information of an anchor proxy mobile node when a physical entity in which a home MIP FA of a mobile terminal resides is changed. The "physical entity in which a home MIP FA of a mobile terminal resides" is referred to as the "third physical entity" in the following description. Then, the second physical entity sends a message carrying an MT ID to the anchor proxy mobile node according to the address information of the anchor proxy mobile node. MIP registration or deregistration of the mobile terminal corresponding to the MT ID is implemented according to related information of the message carrying the MT ID.

Figure 6:
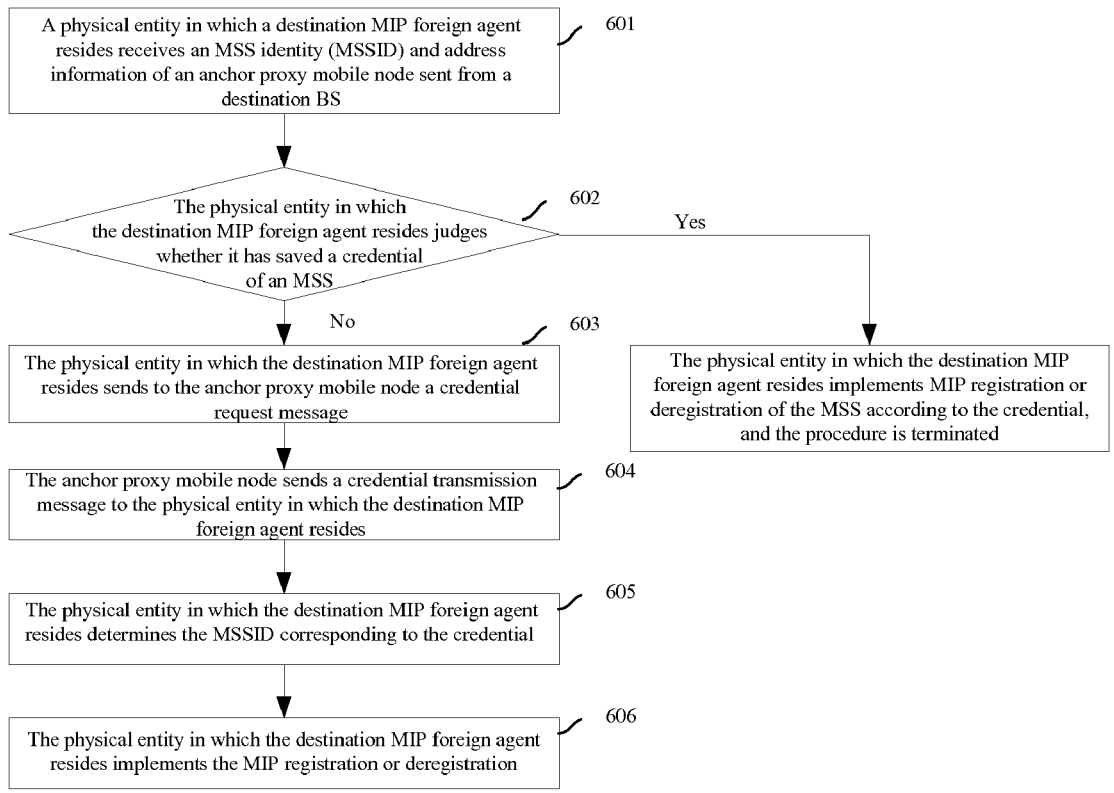
FIG. 6 is a flowchart of a method for initiating MIP registration or deregistration by a physical entity in which a destination MIP FA resides when a physical entity in which a home MIP FA of a mobile terminal resides is changed caused by BS handover of the mobile terminal.
Figure 7:
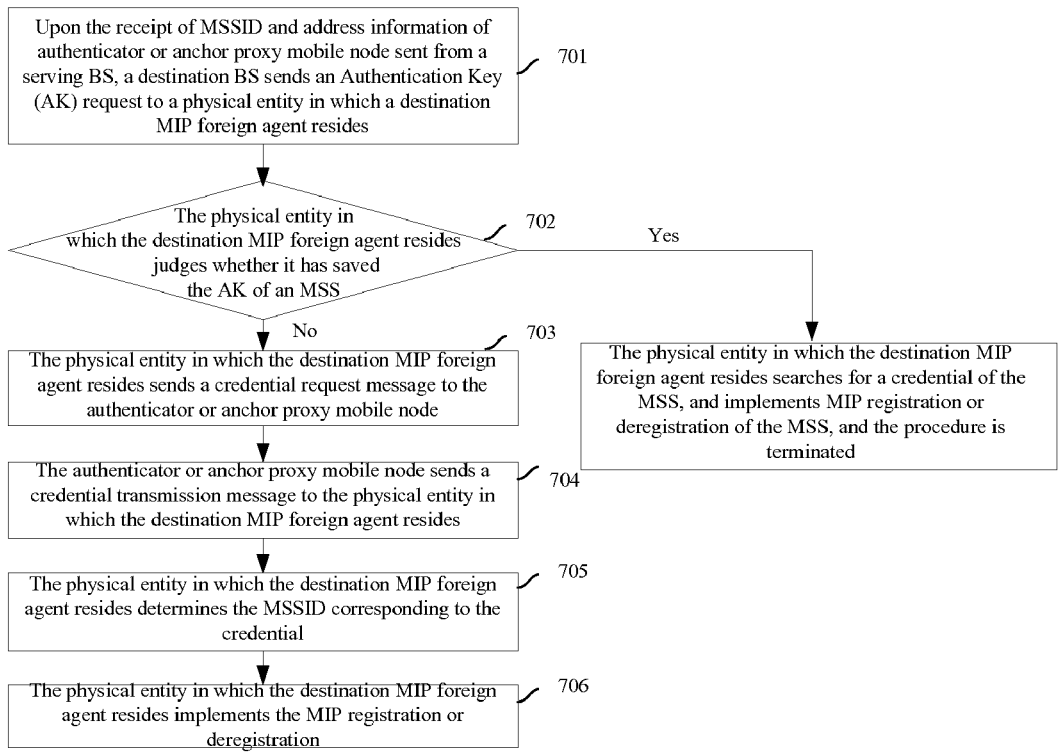
FIG. 7 is a flowchart of a method for initiating MIP registration or deregistration by a physical entity in which a destination MIP FA resides, when a physical entity in which a home MIP FA of a mobile terminal resides is changed due to BS handover of the mobile terminal.
Figure 8:
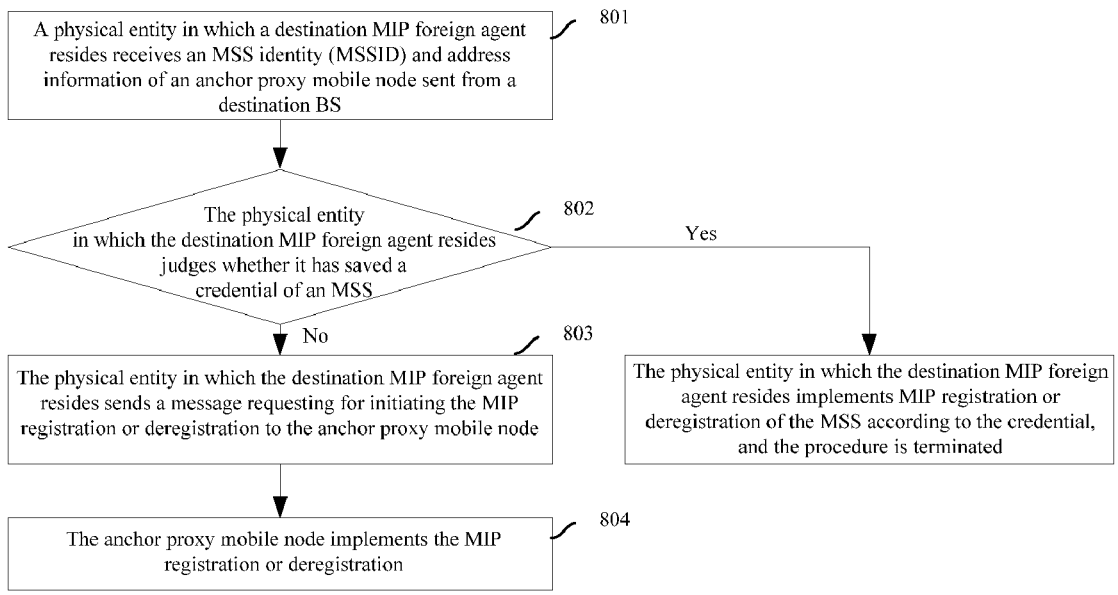
FIG. 8 is a flowchart of a method for initiating MIP registration or deregistration by an anchor proxy mobile node, when a physical entity in which a home MIP FA of a mobile terminal resides is changed due to BS handover of the mobile terminal.
Figure 9:
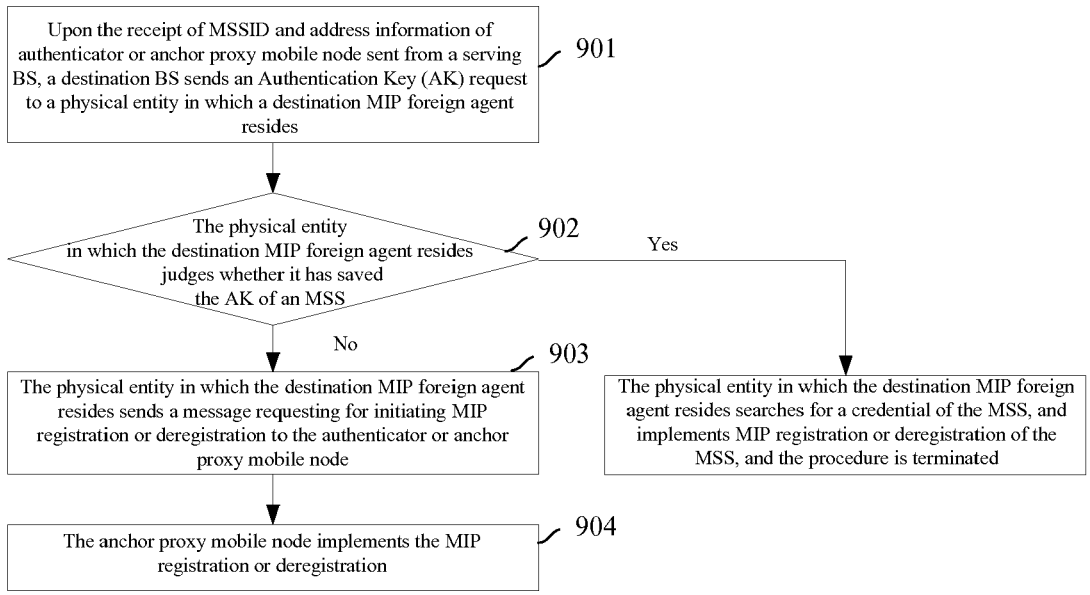
FIG. 9 is a flowchart of a method for initiating MIP registration or deregistration by an anchor proxy mobile node, when a physical entity in which a home MIP FA of a mobile terminal resides is changed due to BS handover of the mobile terminal.
Figure 10:
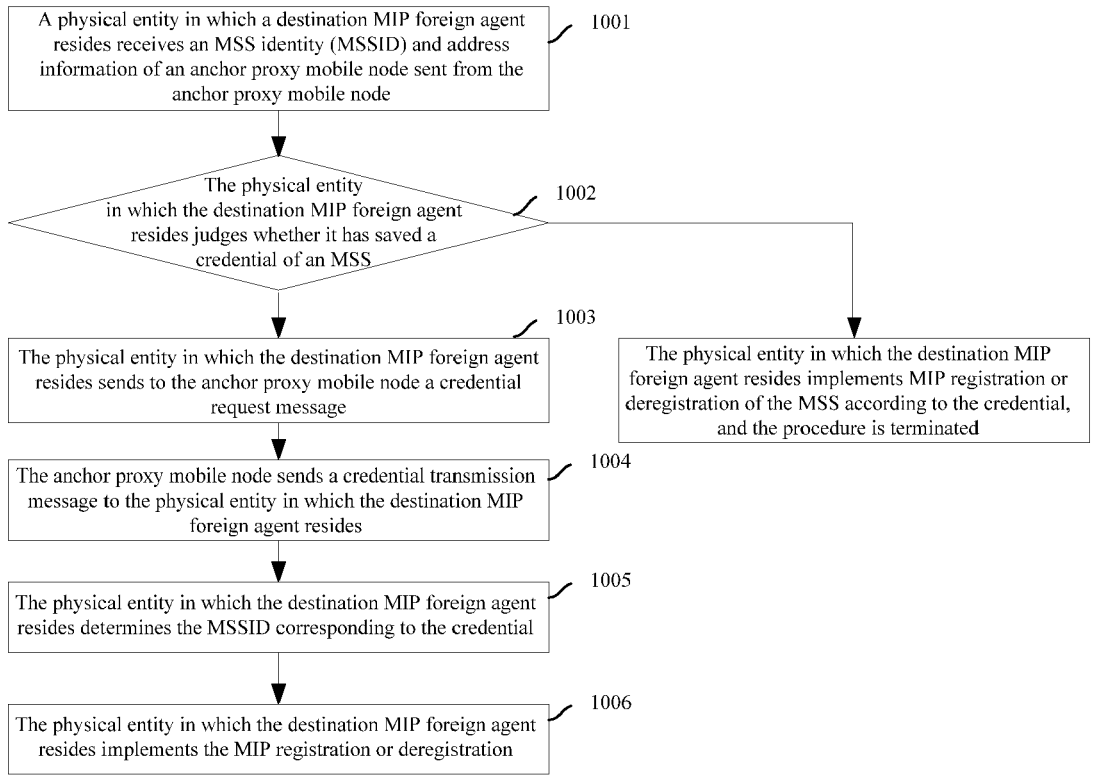
FIG. 10 is a flowchart of a method for initiating MIP registration or deregistration by a physical entity in which a destination MIP FA resides, when a physical entity in which a home MIP FA of a mobile terminal resides is changed, but not BS handover of the mobile terminal.
Figure 11:
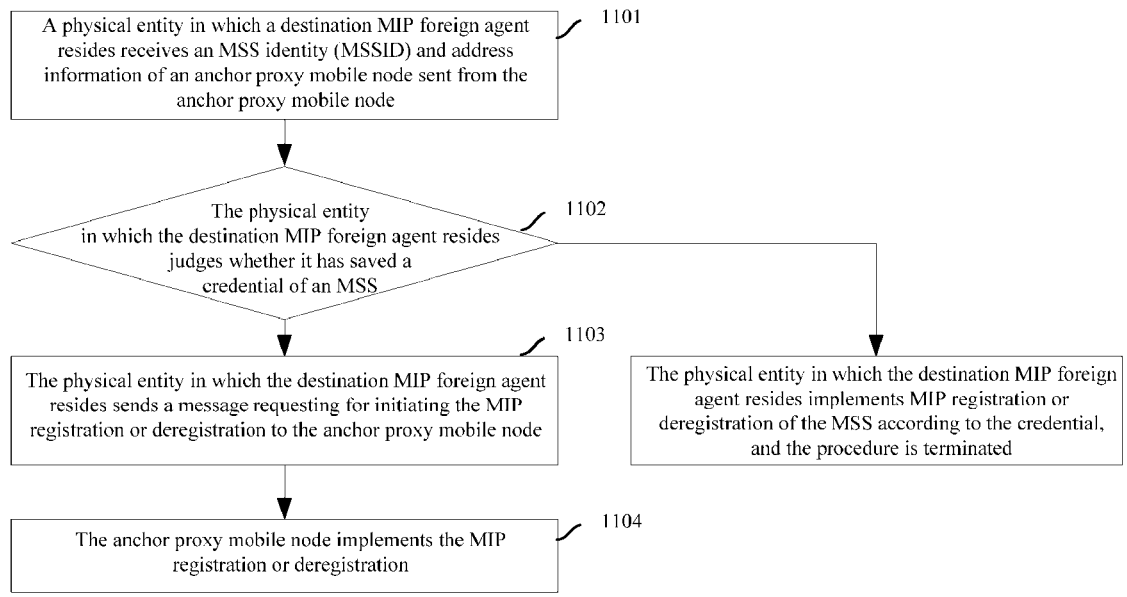
FIG. 11 is a flowchart of a method for initiating MIP registration or deregistration by an anchor proxy mobile node, when an physical entity in which a home MIP FA of a mobile terminal resides is changed, but not BS handover of the mobile terminal.

The MIP registration or deregistration of the mobile terminal can be initiated by the second physical entity after acquiring a credential of the mobile terminal from the anchor proxy mobile node, or initiated by the anchor proxy mobile node when it determines that the third physical entity is changed. FIGS. 6, 7 and 10 show various embodiments for initiating the MIP registration or deregistration by the second physical entity. FIGS. 8, 9 and 11 show various embodiments of methods for initiating the MIP registration or deregistration by the anchor proxy mobile node.

Figure 5:
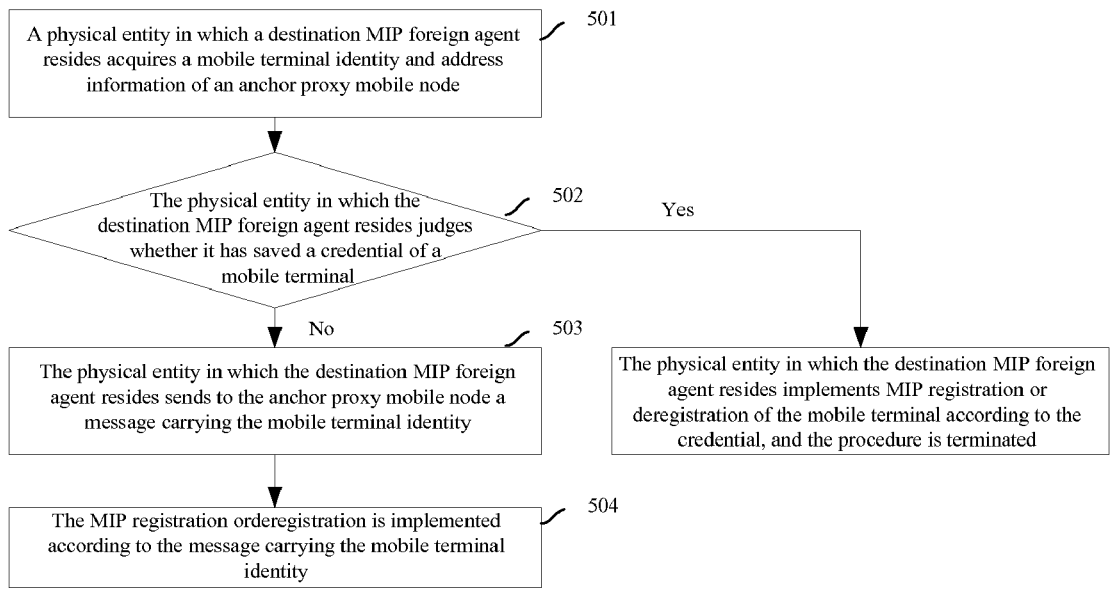
FIG. 5 is a flowchart of a method for MIP registering or deregistering.

FIG. 5 illustrates a method for MIP registering or deregistering. The method includes the following:

At block 501, a second physical entity acquires an MT ID and address information of an anchor proxy mobile node.

If the change of a physical entity in which a MIP FA resides is caused by BS handover of the mobile terminal, the second physical entity acquires the MT ID and the address information of the anchor proxy mobile node from a destination BS. If a first physical entity and the anchor proxy mobile node used for saving the credential of the mobile terminal are configured in the same entity, the mobile terminal is covered in the BS corresponding to the physical entity in which the serving MIP FA resides before the handover. The address information of the anchor proxy mobile node is address information of the first physical entity.

If the change of the physical entity at which the MIP FA is located is caused by resource optimization, the second physical entity acquires the MT ID and the address information of the anchor proxy mobile node from the anchor proxy mobile node.

At block 502, the second physical entity checks whether the credential of the mobile terminal corresponding to received MT ID is saved. If the second physical entity saves the credential, the second physical entity implements MIP registration or deregistration of the mobile terminal according to the credential, and terminates the current procedure; otherwise, performs block 503.

The second physical entity can acquire the credential from the anchor proxy mobile node, and the credential is of the mobile terminal managed by the anchor proxy mobile node.

The block 502 is optional, i.e. block 503 can be directly performed after block 501.

At block 503, the second physical entity sends a message carrying the MT ID to the anchor proxy mobile node according to the address information of the anchor proxy mobile node.

At block 504, the MIP registration or deregistration is implemented according to related information in the message carrying MT ID. The related information includes the MT ID or a transaction ID.

FIG. 6 illustrates various embodiments of a method for initiating MIP registration or deregistration by a second physical entity, when a third physical entity is changed due to BS handover of a mobile terminal. In the embodiment, a Mobile Subscriber Station (MSS) is a mobile terminal. The method is described as in further detail below.

At block 601, the second physical entity receives an identity of an MSS (MSSID) and address information of an anchor proxy mobile node, the MSSID and the address information is sent from a destination BS. The second physical entity can acquire the address information of the anchor proxy mobile node via the following two methods:

One method: The MSS sends a handover request carrying the MSSID and a BS identity (BSID) to a serving BS to which the mobile terminal connects before handover. Upon the receipt of the handover request, the serving BS sends to the destination BS to which the MSS is switched a handover request message carrying the MSSID and the address information of the anchor proxy mobile node. Upon the receipt of the handover request message sent from the serving BS and a ranging request (RR) sent from the MSS, the destination BS sends to the second physical entity of the destination BS a notification message indicating that the MSS switches to the destination BS. The notification message carries the address information of the anchor proxy mobile node acquired from the handover request message and the MSSID.

The other method: The MSS directly sends to the destination BS a RR message carrying a handover indication message, the MSSID and a serving BSID. Upon the receipt of the RR message, the destination BS sends to the serving BS a request for acquiring the address information of the anchor proxy mobile node according to the received serving BSID. The request carries the MSSID. Upon the receipt of the request for acquiring the address information of the anchor proxy mobile node, the serving BS searches for the address information of the anchor proxy mobile node corresponding to the MSSID carried in the request, and returns the address information of the anchor proxy mobile node to the destination BS. Upon the receipt of the address information of the anchor proxy mobile node, the destination BS sends to the second physical entity a notification message indicating that the MSS switches to the destination BS. The notification message carries the MSSID and the address information of the anchor proxy mobile node. The serving BS saves corresponding relation between the MSSID and the address information of the anchor proxy mobile node, the MSSID is the identification of the MSS managed by the serving BS.

At block 602, the second physical entity checks whether a credential of the MSS corresponding to the received MSSID is saved. If the second physical entity saves the credential, the second physical entity implements MIP registration or deregistration of the MSS according to the credential, and terminates the procedure; if the second physical entity does not save the credential, performs Block 603.

Block 602 is optional, i.e. Block 603 can be directly performed after Block 601. At block 603, the second physical entity sends to the anchor proxy mobile node a credential request message, where the message carries the MSSID according to the received address information of the anchor proxy mobile node. The credential request message may further carry a transaction ID for exclusively indicating the credential request message. In this case, the second physical entity saves a corresponding relation between the credential request message and the transaction ID.

At block 604, upon the receipt of the credential request message, the anchor proxy mobile node searches for the credential of the MSS corresponding to the MSSID carried in the credential request message, and sends to the second physical entity a credential transmission message carrying the credential. The credential transmission message may be transmitted to the second physical entity via a security channel established between the anchor proxy mobile node and the second physical entity.

To identify which MSS corresponds to the credential, the credential transmission message may carry the MSSID. However, if the credential request message carries the transaction ID, the credential transmission message may not carry the MSSID. Because after the second physical entity receives the credential transmission message carrying the transaction ID, the second physical entity may search for credential request message saved or sent corresponding to the credential transmission message, and acquire the MSS corresponding to the credential according to the MSSID carried in the credential request message.

At block 605, upon the receipt of the credential transmission message carrying the credential, the second physical entity determines the MSSID corresponding to the credential.

At block 606, the second physical entity implements the MIP registration or deregistration of the determined MSS according to the credential.

FIG. 7 illustrates various embodiments of a method for initiating MIP registration or deregistration by a second physical entity, when a third physical entity is changed due to BS handover of a mobile terminal. In various embodiments, an MSS is the mobile terminal. An anchor proxy mobile node and an authenticator are configured in the same entity. The method is described in further detail below.

At block 701, upon the receipt of an MSSID and address information sent from a serving BS, a destination BS sends to a second physical entity of the destination BS an authentication key (AK) request message. The AK request message carries the MSSID and the address information. The address information is of an authenticator or an anchor proxy mobile node.

The method for the destination BS acquiring the address information of the authenticator or the anchor proxy mobile node is same with the method for the destination BS acquiring the address information of the anchor proxy mobile node described in the block 601.

At block 702, upon the receipt of the AK request message, the second physical entity checks whether the AK of the MSS corresponding to the MSSID carried in the AK request message is saved. If the second physical entity saves the AK of the MSS, the second physical entity searches to acquire the credential of the MSS, implements MIP registration or deregistration of the MSS according to the credential, and terminates the procedure; If the second physical entity does not save the AK of the MSS, control proceeds to block 703.

If the second physical entity saves the AK of MSS, it is indicated that the proxy mobile node of the MSS is not changed during the BS handover, and the second physical entity can confirm the credential of the saved MSS. If the second physical entity does not save the AK of the MSS, it is indicated that the proxy mobile node of MSS is changed during the BS handover, and the second physical entity does not save the credential of the MSS. Block 702 is optional.

Block 703: The second physical entity sends a credential request message to the authenticator or the anchor proxy mobile node according to the address information carried in the AK request message. The second physical entity requests the authenticator or the anchor proxy mobile node to provide the credential of the MSS. The credential request message carries the MSSID, the transaction ID may be carried.

At block 704: Upon the receipt of the credential request message, the authenticator or the anchor proxy mobile node searches for and acquires the credential of the MSS corresponding to the MSSID according to the MSSID carried in the credential request message, and sends to the second physical entity a credential transmission message carrying the credential via an established security channel. The credential transmission message carries the MSSID or the transaction ID.

Block 705: Upon the receipt of the credential transmission message, the second determines the MSSID corresponding to the credential carried in the credential transmission message.

Block 706: The second physical entity implements the MIP registration or deregistration of the MSS corresponding to the MSSID according to the credential.

FIG. 8 illustrates various embodiments of a method for initiating MIP registration or deregistration by an anchor proxy mobile node, when a third physical entity is changed due to BS handover of the mobile terminal. In these various embodiments, a MSS is the mobile terminal. The method is described in further detail below.

At block 801, a second physical entity receives a MSSID and address information of an anchor proxy mobile node sent from a destination BS.

The method for the second physical entity acquiring the address information of the anchor proxy mobile node is the same with that of the block 601.

At block 802, the second physical entity checks whether a credential of the MSS corresponding to the received MSSID is saved. If the second physical entity saves the credential of the MSS, the second physical entity implements MIP registration or deregistration of the MSS according to the credential, and terminates the current procedure; if the second physical entity does not save the credential of the MSS, performs block 803. Block 802 is 2 optional.

At block 803, the second physical entity sends to the anchor proxy mobile node a request message for initiating MIP registration or deregistration according to the received address information of the anchor proxy mobile node. The request message carries the MSSID and a transaction ID may be carried.

At block 804, upon the receipt of the request message for initiating the MIP registration or deregistration, the anchor proxy mobile node searches for and acquires the credential of the MSS corresponding to the MSSID carried in the request message, and implements the MIP registration or deregistration of the MSS corresponding to the MSSID according to the credential.

FIG. 9 illustrates various embodiments of a method for initiating MIP registration or deregistration by an anchor proxy mobile node, when a third physical entity is changed due to BS handover of the mobile terminal. In these embodiments, a MSS is the mobile terminal. An anchor proxy mobile node and an authenticator are configured in the same entity. The method is described as in further detail below.

At block 901: Upon the receipt of a MSSID and address information sent from a serving BS, a destination BS sends to a second physical entity of the destination BS an authentication key (AK) request message. The AK request message carries the address information and the MSSID. The address information is of the authenticator or the anchor proxy mobile node.

The method for the destination BS acquiring the address information of the authenticator or the anchor proxy mobile node is the same with the method for the destination BS acquiring the address information of the anchor proxy mobile node described in block 601.

At block 902, upon the receipt of the AK request message, the second physical entity checks whether the AK of the MSS corresponding to the MSSID carried in the AK request message is saved. If the second physical entity saves the AK of the MSS, the second physical searches for and acquires a credential of the MSS, and implements MIP registration or deregistration of the MSS according to the credential, and terminates the procedure; if the second physical entity does not save the AK of the MSS, performs the block 903.

At block 903, the second physical entity sends to the authenticator or anchor proxy mobile node a request message for initiating MIP registration or deregistration according to the received address information. The request message for initiating the MIP registration or deregistration carries the MSSID, and a transaction ID may be carried.

Block 904: Upon the receipt of the request message for initiating the MIP registration or deregistration, the anchor proxy mobile node searches for and acquires the credential of the MSS corresponding to the MSSID carried in the request message for initiating MIP registration or deregistration, and implements the MIP registration or deregistration of the MSS corresponding to the MSSID according to the credential.

FIG. 10 illustrates various embodiments of a method for initiating MIP registration or deregistration by a second physical entity, when a third physical entity is changed, but not BS handover of the mobile terminal. The method is described in further detail below.

At block 1001, a second physical entity receives a MSSID and address information of an anchor proxy mobile node sent from the anchor proxy mobile node.

After a third physical entity is changed is known from a first physical entity or the second physical entity, the anchor proxy mobile node sends the MSSID and its address information to the second physical entity.

By way of non-limiting example, if the BS connects with Physical entity 1 in which the MIP FA resides directly, the physical entity 1 connects with an HA via a physical entity 2 in which the MIP FA resides, the BS being currently connected to the MSS. The physical entity 2 initiates MIP registration or deregistration of the MSS to the HA. The physical entity 1 may then also connect with the HA directly for resource optimization. In this case, the physical entity 2 or physical entity 1 notifies the anchor proxy mobile node that the third physical entity of the MSS is changed. The physical entity 2 or physical entity 1 notifies the anchor proxy mobile node of the MSSID and the address information of the changed second physical entity, i.e. the address information of the physical entity 1 in which the MIP FA resides. Upon the receipt of the notification, the anchor proxy mobile node sends the MSSID and its address information to the second physical entity, i.e. the physical entity 1 in which the MIP FA resides.

Blocks 1002~1006 are the same with Blocks 602~606.

FIG. 11 illustrates various embodiments of a method for initiating MIP registration or deregistration by an anchor proxy mobile node, when the third physical entity is changed, without the BS handover of the mobile terminal. The method is described in further detail below.

Block 1101 is same with Block 1001.

Blocks 1102~1104 are same with Blocks 802~804.

Figure 12:
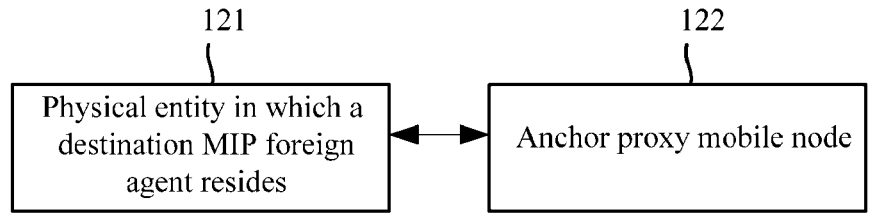
FIG. 12 is a block diagram of a system for initiating MIP registration or deregistration by a physical entity in which a destination MIP FA resides.

FIG. 12 illustrates a system for initiating MIP registration or deregistration by a second physical entity, the system mainly includes the second physical entity 121 and an anchor proxy mobile node 122. The second physical entity 121 is configured to send to the anchor proxy mobile node 122 a credential request message carrying an MT ID according to acquired address information of anchor proxy mobile node 122, and implement MIP registration or deregistration of the mobile terminal corresponding to the MT ID according to a credential sent from anchor proxy mobile node 122. The second physical entity 121 is further configured to send to the anchor proxy mobile node 122 a notification indicating that a third physical entity is changed, when detecting that the third physical entity is changed to the second physical entity. The notification carries the MT ID and the address information of the second physical.

Anchor proxy mobile node 122 is configured to save a corresponding relation between the MT ID and a credential, search for the credential corresponding to the MT ID carried in the credential request message upon the receipt of the credential request message sent from the second physical entity 121, and send the credential to the second physical entity 121. The anchor proxy mobile node 122 is further configured to send its address information to the second physical entity 121 upon the receipt of the notification indicating that the third physical entity is changed. The notification is sent from the second physical entity 121.

Figure 13:
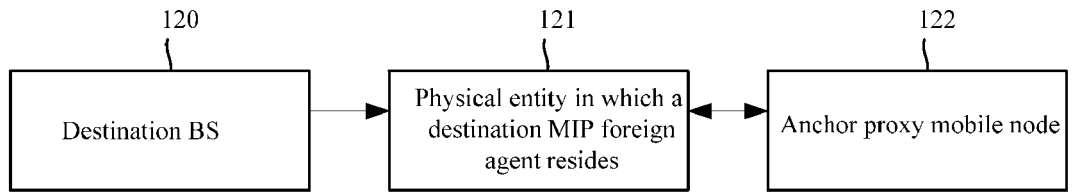
FIG. 13 is a block diagram of a system in accordance with the method of the FIG. 6.

FIG. 13 illustrates various embodiments of a system for initiating MIP registration or deregistration by a second physical entity. As shown in FIG. 13, in comparison with the various embodiments shown in FIG. 12, the system of this embodiment further includes a destination BS 120 for sending the MT ID and the address information of anchor proxy mobile node 122 to the second physical entity 121.

Figure 14:
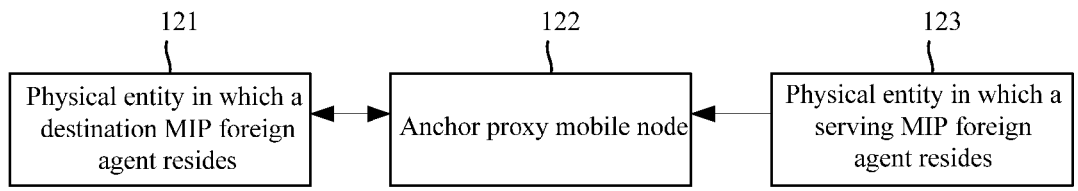
FIG. 14 is a block diagram of a system in accordance with the method of the FIG. 7.

FIG. 14 illustrates various embodiments of a system for initiating MIP registration or deregistration by a second physical entity. As shown in FIG. 14, in comparison with the various embodiments shown in FIG. 12, the system further includes a first physical entity 123. The first physical entity 123 is configured to send to the anchor proxy mobile node 122 a notification indicating that a third physical entity is changed when change of the third physical entity is detected. The notification carries the MT ID and the address information of the second physical entity 121. In addition, the anchor proxy mobile node 122 is further configured to send its address information to the second physical entity 121 according to the address information of the second physical entity 121 carried in the notification, after receiving the notification indicating that the third physical entity is changed. The notification is sent from the first physical entity 123.

Figure 15:
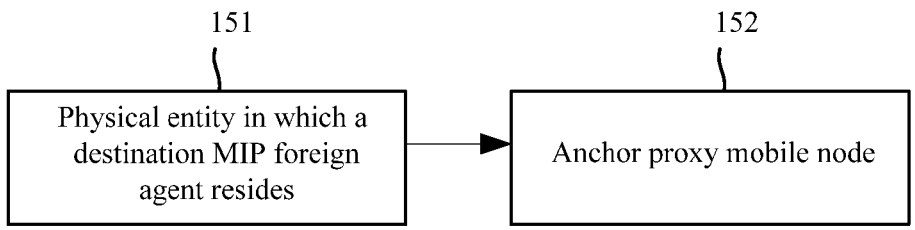
FIG. 15 is a block diagram of a system for initiating MIP registration or deregistration by an anchor proxy mobile node.

FIG. 15 illustrates a system for initiating MIP registration or deregistration according to various embodiments. As shown in FIG. 15, the system includes a second physical entity 151 and an anchor proxy mobile node 152. The second physical entity 151 is configured to send to the anchor proxy mobile node 152 a request message for initiating MIP registration or deregistration, the request message carries an MT ID according to acquired address information of anchor proxy mobile node 152. The second physical entity 151 is further configured to send to the anchor proxy mobile node 152 a notification, the notification indicates a third physical entity is changed, after detecting the third physical entity is changed to the second physical entity. The notification carries the MT ID and the address information of the second physical entity 151.

Anchor proxy mobile node 152 is configured to save corresponding relation between the MT ID and a credential, search for the credential corresponding to the MT ID carried in the request message, after receives the request message for initiating the MIP registration or deregistration sent from the second physical entity 151, and implement the MIP registration or deregistration of the mobile terminal corresponding to the MT ID sent from the second physical entity 151 according to the credential. The anchor proxy mobile node 152 is further configured to send its address information to the second physical entity 151 upon the receipt of the notification indicating that the second physical entity is changed. The notification is sent from the second physical entity 151.

Figure 16:
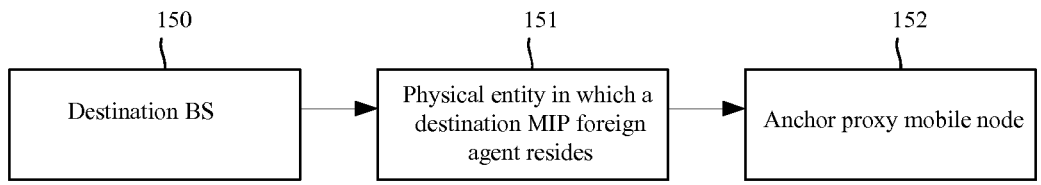
FIG. 16 is a block diagram of a system in accordance with the method of the FIG. 8.

FIG. 16 illustrates various embodiments of a system for initiating MIP registration or deregistration by an anchor proxy mobile node. As shown in FIG. 16, in comparison with the various embodiments shown in FIG. 15, the system further includes a destination BS 150. The destination BS 150 is configured to send an MT ID and address information of anchor proxy mobile node 152 to the second physical entity.

Figure 17:
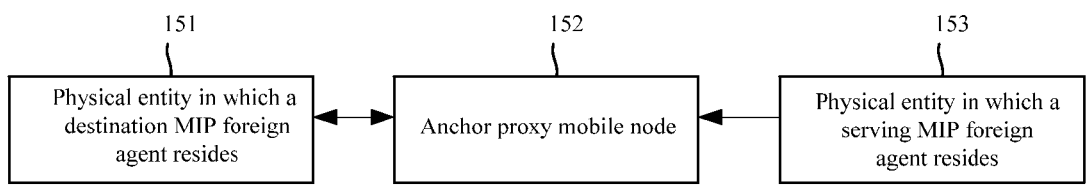
FIG. 17 is a block diagram of a system in accordance with the method of the FIG. 9.

FIG. 17 illustrates various embodiments of a system for initiating registration or deregistration by an anchor proxy mobile node. As shown in FIG. 17, in comparison with the various embodiments shown in FIG. 15, the system further includes a first physical entity 153. The first physical entity 153 is configured to send to the anchor proxy mobile node 152 a notification, the notification indicates that a third physical entity is changed, after detecting that the third physical entity is changed. The notification carries an MT ID and address information of the second physical entity 151.

In addition, the anchor proxy mobile node 152 is further configured to send its address information to the second physical entity 151 according to the address information of the second physical entity 151 carried in the notification, after receiving the notification indicating that third the physical entity is changed. The notification is sent from the first physical entity 153.

The various embodiments described herein can include a physical entity in which a destination MIP FA resides obtains the MT ID and address information of an anchor proxy mobile node, a message carrying the MT ID is sent to the anchor proxy mobile node. The physical entity in which a destination MIP FA resides initiates MIP registration or deregistration according to a credential returned by the anchor proxy mobile node. Alternatively, the anchor proxy mobile node may initiate the MIP registration or deregistration according to the credential saved by itself. Therefore, the MIP registration or deregistration is implemented when an entity which is used for initinating the MIP registration or deregistration instead of a MIP client of the mobile terminal is changed.

Though illustration and description of the present disclosure have been given with reference to various preferred embodiments thereof, it should be appreciated by persons of ordinary skill in the art that various changes in forms and details can be made without deviation from the spirit and scope of this disclosure, which are defined by the appended claims.

What is claimed is:

1. A method for Mobile Internet Protocol (MIP) registering or deregistering, the method comprising:
    obtaining, by a physical entity in which a destination MIP Foreign Agent (FA) resides, an identity of a mobile terminal (MT ID) and address information of an anchor proxy mobile node or an authenticator;
    sending, by the physical entity in which the destination MIP FA resides, a message carrying the MT ID to the anchor proxy mobile node or the authenticator;
    receiving, by the physical entity in which the destination MIP FA resides, a credential corresponding to the MT ID sent from the anchor proxy mobile node or the authenticator after the anchor proxy mobile node or the authenticator receives the message carrying the MT ID and searches for the credential corresponding to the MT ID; and
    implementing, by the physical entity in which the destination MIP FA resides, MIP registration or deregistration for the mobile terminal using the credential.

2. The method of claim 1, wherein the credential is sent to the physical entity in which the destination MIP FA resides via a security channel established between the physical entity in which the destination MIP FA resides and the anchor proxy mobile node or the authenticator.

3. The method of claim 1, wherein the credential request message further carries a transaction ID, and the method further comprises:
    saving, by the physical entity in which the destination MIP FA resides, a corresponding relation between the credential request message and the transaction ID;
    sending, by the anchor proxy mobile node or the authenticator, the transaction ID to the physical entity in which the destination MIP FA resides;
    searching for, by the physical entity in which the destination MIP FA resides, the credential request message corresponding to the transaction ID according to the corresponding relation between the credential request message and the transaction ID;
    searching for, by the physical entity in which the destination MIP FA resides, the MT ID according to the credential request message; and
    determining, by the physical entity in which the destination MIP FA resides, the credential corresponding to the MT ID.

4. The method of claim 1, wherein obtaining, by the physical entity in which the destination MIP FA resides, the address information of the anchor proxy mobile node or the authenticator comprises:
    receiving, by a serving Base Station, BS, a handover request message sent from the mobile terminal, and the handover request message carries the MT ID and a destination BS identity;
    sending, by the serving BS, a handover request carrying the MT ID and the address information of the anchor proxy mobile node or the authenticator to a destination BS corresponding the destination BS identity;

sending, by the destination BS, to the physical entity in which the destination MIP FA resides a notification indicating that the mobile terminal is switched to the destination BS, and the notification carries the MT ID and the address information of the anchor proxy mobile node or the authenticator; and obtaining, by the physical entity in which the destination MIP FA resides, the address information of the anchor proxy mobile node or the authenticator from the notification.

5. The method of claim 1, wherein obtaining, by the physical entity in which the destination MIP FA resides, the address information of the anchor proxy mobile node or the authenticator comprises:

receiving, by a destination BS, a Ranging Request sent from the mobile terminal, and the Ranging Request carries the MT ID and a serving BS identity;

sending, by the destination BS, to a serving BS a request for obtaining the address information of the anchor proxy mobile node or the authenticator according to the serving BS identity, the request carries the MT ID;

searching for, by the serving BS, the address information of the anchor proxy mobile node or the authenticator corresponding to the MT ID, and sending the address information of the anchor proxy mobile node or the authenticator to the destination BS;

sending, by the destination BS, to the physical entity in which the destination MIP FA resides a notification indicating that the mobile terminal is switched to the destination BS, and the notification carries the MT ID and the address information of the anchor proxy mobile node or the authenticator; and obtaining, by the physical entity in which the destination MIP FA resides, the address information of the anchor proxy mobile node or the authenticator.

6. The method of claim 5, wherein
the anchor proxy mobile node and an authenticator are set in a same entity;
the notification is an authentication key (AK) request; and
the address information of the anchor proxy mobile node is identical to address information of the authenticator.

7. The method of claim 1, the method further comprising:
receiving, by the anchor proxy mobile node or the authenticator, a notification sent from a physical entity in which a home serving MIP FA of the mobile terminal resides or the physical entity in which the destination MIP FA resides, the notification is used for indicating that a physical entity in which the MIP FA resides is to be changed and carrying the MT ID and address information of the physical entity in which the destination MIP FA resides; and sending, by the anchor proxy mobile node or the authenticator, the address information of the anchor proxy mobile node or the authenticator to the physical entity in which the destination MIP FA resides.

8. A physical entity in which a destination Mobile Internet Protocol (MIP) Foreign Agent (FA) resides for implementing MIP registration or deregistration, the physical entity comprising:

a sending unit, the sending unit sending a message carrying an identity of a mobile terminal (MT ID) to an anchor proxy mobile node or an authenticator according to address information of the anchor proxy mobile node or the authenticator;

a receiving unit, the receiving unit receiving a credential corresponding to the MT ID sent from the anchor proxy mobile node or the authenticator after the anchor proxy mobile node or the authenticator receives the message carrying the MT ID and searches for the credential corresponding to the MT ID; and an implementing unit, the implementing unit implementing MIP registration or deregistration for the mobile terminal using the credential.

9. The physical entity of claim 8, further comprising:
a first unit, the first unit sending a notification indicating that a physical entity in which a home MIP FA of the mobile terminal is switched to the physical entity in which the destination MIP FA resides, wherein the notification carries the MT ID and address information of the physical entity in which the destination MIP FA resides; and a second unit, the second unit receiving the address information of the anchor proxy mobile node or the authenticator sent from the anchor proxy mobile node or the authenticator.

10. The physical entity of claim 8 further comprising a third unit configured to receive the MT ID and the address information of the anchor proxy mobile node or the authenticator from a destination BS.

11. An anchor proxy mobile node or an authenticator for implementing Mobile Internet Protocol (MIP) registration or deregistration, comprising:

a first unit, the first unit receiving a message which is sent from a physical entity in which a destination MIP Foreign Agent (FA) resides and used for carrying an identity of a mobile terminal (MT ID);

a second unit, the second unit searching for a credential saved by the anchor proxy mobile node or the authenticator according to the MT ID; and a third unit, the third unit implementing MIP registration or deregistration using the credential;

a sixth unit, the sixth unit receiving a notification which is used for indicating that a physical entity in which a home MIP FA of a mobile terminal resides is to be changed and sent from a physical entity in which a serving MIP FA resides, wherein the notification carries the MT ID and address information of the physical entity in which the destination MIP FA resides; and a seventh unit, the seventh unit sending address information of the anchor proxy mobile node or the authenticator to the physical entity in which the destination MIP FA resides according to the notification.

12. The anchor proxy mobile node or the authenticator of claim 11, further comprising:

a fourth unit, the fourth unit receiving a notification which is used for indicating that a physical entity in which a home MIP FA of the mobile terminal resides is to be changed and sent from the physical entity in which the destination MIP FA resides; and a fifth unit, the fifth unit sending address information of the anchor proxy mobile node or the authenticator to the physical entity in which the destination MIP FA resides.

* * * * *